H. HOWARD.
PROCESS OF MAKING CARBON DIOXID AND SOLID SODIUM SULFITE.
APPLICATION FILED NOV. 22, 1915.
1,266,595.
Patented May 21, 1918.
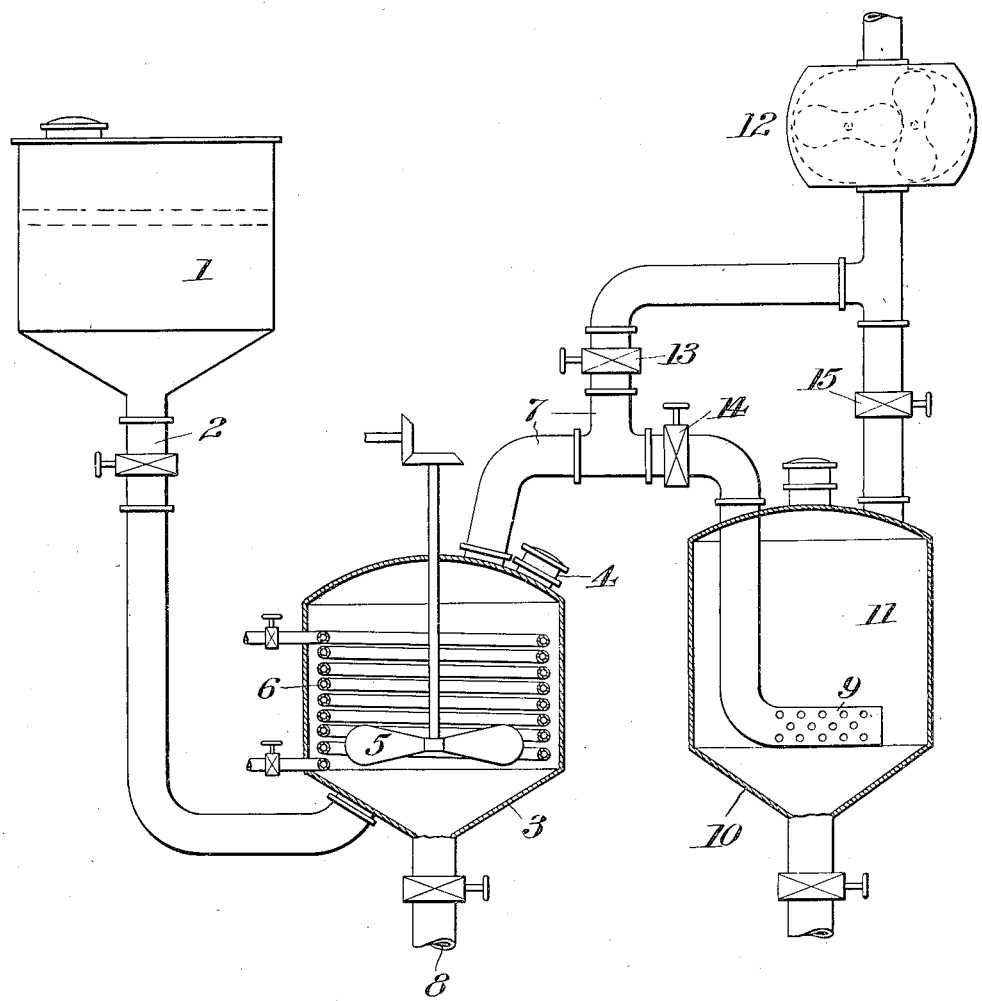
Inventor
Henry Howard
by Byrnes Townsend & Brickenstein
Attorneys.

UNITED STATES PATENT OFFICE.

HENRY HOWARD, OF BROOKLINE, MASSACHUSETTS, ASSIGNOR TO GENERAL CHEMICAL COMPANY, A CORPORATION OF NEW YORK.

PROCESS OF MAKING CARBON DIOXID AND SOLID SODIUM SULFITE.

1,266,595. Specification of Letters Patent. Patented May 21, 1918.

Original application filed March 6, 1913, Serial No. 752,281. Divided and this application filed November 22, 1915. Serial No. 62,700.

*To all whom it may concern:*

Be it known that I, HENRY HOWARD, a citizen of the United States, residing at Brookline, in the county of Norfolk and State of Massachusetts, have invented certain new and useful Improvements in Processes of Making Carbon Dioxid and Solid Sodium Sulfite, of which the following is a specification.

This invention relates to a process of making carbon dioxid and solid sodium sulfite, and is an improvement upon the process described in my Patent No. 651,569, dated June 12, 1900.

The object of my invention is to make pure carbon dioxid from a suitable carbonate, such as sodium mono-carbonate, sesqui-carbonate, or bicarbonate, or a mixture of them, or from any other alkaline or alkaline-earth carbonate, under conditions which will give a solid sulfite salt that may be utilized for other purposes, such as the manufacture of bisulfite of soda, etc.

In carrying out this process a solid carbonate of soda, or of any other suitable base, is added to a strong, preferably saturated, solution of sodium bisulfite, or a bisulfite of the base in the carbonate, in such quantities that carbon dioxid is liberated and a neutral sulfite in the solid form is produced by the reaction between them, as indicated by the following reactions:—

(solid) $Na_2CO_3 + 2NaHSO_3 = 2Na_2SO_3 + CO_2 + H_2O.$

With solid bicarbonate of soda:

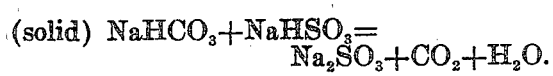

(solid) $NaHCO_3 + NaHSO_3 = Na_2SO_3 + CO_2 + H_2O.$

This reaction, with a solid sodium carbonate, produces neutral sodium sulfite in such excess that it also separates from the solution as a finely-divided solid sodium sulfite suspended in a saturated solution of sodium sulfite, and may be used in making solid sodium disulfite according to the process described in my prior Patent No. 1,084,436, dated January 13, 1914. During the operation, it is preferable to heat the mixture to drive out all the carbon dioxid, otherwise some will remain dissolved in the solution of sodium sulfite, and be lost.

In the accompanying drawing, which illustrates a plant for carrying out the process, a tank 1, provided with a valved outlet 2, supplies a strong solution of bisulfite to the bottom of the reaction tank 3; a suitable carbonate is added to tank 3 through the air-lock manhole 4, and is kept in suspension in the bisulfite solution by the strirrer 5; the mixture of bisulfite and carbonate may be heated by the heating coil 6, if desired. The gas evolved by the reaction passes out through the T-outlet pipe 7, and when the reaction is over, the resulting mass of solid sulfite of soda and its saturated solution are removed through the bottom outlet 8. The carbon dioxid may be used as generated, or may be purified by passing into a suitable scrubber 10 through a perforated pipe 9. The scrubber preferably contains a solution of carbonate or bicarbonate of soda 11, which absorbs any traces of sulfur-dioxid gas that may come from the bisulfite in tank 3. A pump 12 exhausts the dioxid from the reaction tank 3 direct by opening valve 13 and closing valves 14 and 15; or through the scrubber by closing valve 13 and opening valves 14 and 15.

I have shown the admission of bisulfite solution to the bottom of the reaction tank 3 for the reason that bisulfites are not very stable in solution, but tend to decompose on slight heating, and on agitation. By introducing the bisulfite solution beneath the column of liquid containing the suspended carbonate, the bisulfite reacts upon the lower strata of carbonate, the evolved gas passing through the upper strata and in contact with more carbonate, both dissolved and suspended, whereby any sulfur dioxid will be absorbed, liberating carbon dioxid and forming neutral sulfite. The agitation of the mass not only maintains the carbonate and sulfite in suspension as above noted, but also facilitates and accelerates the absorption.

In my prior Patent No. 651,569, above referred to, it is stated that dry sodium carbonate may be used as a source of carbon dioxid, the bisulfite solution to which it is added having sufficient water to dissolve it. According to the present process, the same reaction is employed but the water is present in restricted proportion to the reacting bodies (bisulfite and carbonate) with the result that a portion of the neutral sulfite which is formed is obtained directly in solid form, the output of product from an apparatus of given size being correspondingly increased. The proportion of carbonate added is carefully controlled, as indicated by the foregoing equations, to avoid any excess above the amount required to yield the normal sulfite, for the reason that any such excess, whether in solution or in suspension, would contaminate the product (sulfite) if intended for commercial purposes, or would involve a corresponding loss of carbon dioxid in case the sulfite is treated with burner gases for re-conversion into bisulfite in accordance with my Patent No. 1,084,436, according to which the neutral sulfite solution containing undissolved sulfite is saturated with sulfur dioxid from burner gases or other suitable source, the resulting solid bisufite removed, and the mother liquor utilized for the preparation of carbon dioxid.

I do not claim herein a process of making pure carbon dioxid and a solid normal sulfite in a single operation by reacting upon an aqueous solution of a bisulfite with a solid carbonate, the carbonate not in excess of the proportion required for the formation of normal sulfite, and the water in insufficient proportion for the complete solution of the normal sulfite formed; said subject-matter being claimed in my copending application Serial No. 752,281, filed March 6, 1913, whereof the present application is a division.

I claim:—

1. The process of producing carbon dioxid, comprising effecting a reaction between a soluble carbonate and a soluble bisulfite, thereby forming a normal sulfite and carbon dioxid, purifying the carbon dioxid from sulfur dioxid by causing the carbon dioxid to bubble through undecomposed carbonate maintained in mechanical suspension in a liquid, said liquid in insufficient proportion for the solution of the carbonate, and collecting the substantially pure carbon dioxid.

2. The process of producing carbon dioxid, comprising effecting a reaction between sodium carbonate and dissolved sodium bisulfite, thereby forming normal sodium sulfite and carbon dioxid, purifying the carbon dioxid from sulfur dioxid by causing the carbon dioxid to bubble through sodium carbonate maintained in mechanical suspension in the liquid, said liquid in insufficient proportion for the solution of the carbonate, and collecting the substantially pure carbon dioxid.

3. In a process of producing carbon dioxid by a reaction between sodium carbonate and dissolved sodium bisulfite, the step which consists in introducing the bisulfite solution beneath the surface of a column of liquid carrying sodium carbonate mechanically suspended therein, said liquid in insufficient proportion for the solution of the carbonate.

In testimony whereof I affix my signature in presence of two witnesses.

HENRY HOWARD.

Witnesses:
I. M. GRAHAM,
M. V. O'BRIEN.